United States Patent Office 2,945,049
Patented July 12, 1960

2,945,049

SALTS OF BASIC AMINO ACIDS AND LINOLEIC ACID

Robert W. H. Chang, St. Paul, and Frances L. Moyer, Minneapolis, Minn., assignors to General Mills, Inc., a corporation of Delaware No Drawing. Filed May 25, 1959, Ser. No. 815,247

5 Claims. (Cl. 260—404)

The present invention relates to the basic amino acid salts of linoleic acid. More particularly, it relates to the basic amino acid mono-linoleates.

The novel compounds of the present invention posses unusual properties which render them useful in novel applications. These compounds are more readily soluble in water, aqueous alcohol and other aqueous solutions than linoleic acid itself or the natural sources of the unsaturated acid. These compounds also possess surface-active properties and therefore may be used as edible emulsifiers in food and pharmaceutical preparations. In addition, the compounds of the present invention are extremely stable and resist rancidity, thereby providing a convenient and effective method for storing linoleic acid, which ordinarily is subject to the development of oxidative rancidity.

The compounds of the present invention may be prepared by reacting a basic amino acid with linoleic acid in the presence of a mutual solvent, such as anhydrous methanol or ethanol and the like, and then evaporating the solvent to obtain the solid salt.

One method of obtaining linoleic acid is by the acid hydrolysis of the naturally occurring vegetable fats and oils which contain significant percentages of the linoleic acid esters. Free linoleic acid may then be separated from the mixture of fatty acids so obtained, by repeated low temperature solvent crystallization as well as other means known to the art.

For purposes of the present invention it is not essential that the linoleic acid be separated from said mixture as we find it convenient from an availability standpoint to utilize the mixture of the free fatty acids resulting from the hydrolysis of said vegetable oils.

Illustrative of such a vegetable oil which contains a large percentage of linoleic acid is safflower oil. This oil upon hydrolysis yields a mixture of free fatty acids containing approximately 77% linoleic acid, 16% oleic acid and 5 to 6% of saturated acids. Other commonly occurring oils which upon hydrolysis yield mixtures containing a high percentage of linoleic acid are cottonseed oil, peanut oil, palm oil, sesame oil, corn oil, poppyseed oil and the like.

The amino acids contemplated for use in the present invention are those amino acids which contain a larger number of amino groups than carboxylic groups per molecule. Typical basic amino acids include lysine, arginine, histidine, ornithine, L-2,4-diaminobutyric acid and the like.

These amino acids may be prepared by a variety of methods. One such method described in the literature is the hydrolysis of protein to yield a mixture of neutral, acidic and basic amino acids, followed by the isolation from that mixture of the basic amino acids by utilization of ion exchange resin procedures.

The following examples will further serve to illustrate the present invention.

EXAMPLE I

*Arginine linoleate salt*

Linoleic acid 27.44 grams (0.098 mol) and L-arginine 17.2 grams (0.098 mol) were mixed together in absolute methanol until all dissolved and the solution was filtered. The filtrate was evaporated to dryness to yield the solid, L-arginine linoleate, which analyzed 12.13% nitrogen (theory 12.32% nitrogen). A dilute aqueous solution of the arginine linoleate when shaken gave a stable foam. The solubility of this salt is illustrated in the following table.

TABLE I

| Solvent | Solubility, percent | Remarks |
|---|---|---|
| Water | 1.8 | Soapy solution. |
| 0.85% sodium chloride solution | 3.3 | Clear solution. |
| 5% ethanol | 8.5 | Fluid and clear. |
| 4.2% ethanol | 12.8 | Viscous but clear. |

EXAMPLE II

*Lysine linoleate salt*

Linoleic acid (1 mol) was dissolved in absolute methanol and L-lysine (1 mol) was dissolved in a small amount of water. Both solutions were heated to about 70° C., mixed together and filtered while hot. The filtrate was evaporated at 50° C. under reduced pressure until crystals just began to appear. Isopropyl alcohol was added and the material allowed to crystallize in the refrigerator. The solid salt was removed by filtration, washed with a mixture of absolute methanol and isopropanol, and dried in a vacuum oven at 50° C. overnight. The resulting solid, L-lysine linoleate, analyzed 6.49% nitrogen (theory 6.57% nitrogen).

EXAMPLE III

*L-ornithine linoleate salt*

Linoleic acid (1 mol) and L-ornithine (1 mol) when mixed as described in Example I will form L-ornithine linoleate.

EXAMPLE IV

*2,4-diaminobutyric acid linoleate salt*

Linoleic acid (1 mol) and 2,4-diaminobutyric acid (1 mol) when mixed as described in Example I will form 2,4-diaminobutyric acid linoleate.

EXAMPLE V

*Arginine safflower fatty acid salt*

Safflower oil was hydrolyzed in the presence of acid and the mixture of fatty acids so obtained distilled. The resulting mixture of fatty acids analyzed 75.9% linoleic acid, and had an acid value of 192.2 and an iodine value of 149.0.

L-arginine 87.9 grams (0.9% moisture) and 140.22 grams of the above-described mixture of distilled fatty acids were dissolved in 1500 ml. of absolute methanol and the solution filtered to remove impurities. The filtrate was evaporated at 50° C. under reduced pressure to dryness. The solubility characteristics of the arginine safflate were approximately the same as those of L-arginine linoleate.

EXAMPLE VI

Lysine safflower fatty acid salt

The safflower fatty acid was dissolved in absolute methanol, and an aqueous solution of lysine added until the pH of the clear solution was about 8. The solution was evaporated at 40° C. under reduced pressure until the solid salt came out of solution. The slurry was cooled in a refrigerator for two hours and the solid removed by filtration. The solid salt was washed with absolute methanol and dried in a vacuum oven at 40° C. for six hours. The first crop of the salt analyzed 6.42% of nitrogen (theory—6.57% nitrogen). The lysine safflower fatty acid salt possessed solubility characteristics very similar to those of lysine linoleate.

The stability characteristics of a representative group of the above-described salts are summarized in the following table, in which the safflower fatty acid salts of arginine and lysine are referred to as arginine safflates and lysine safflates respectively.

Stability characteristics of salts of basic amino acids and linoleic acid

A. ROOM TEMPERATURE STORAGE TEST OF THE SOLID SALTS

|  | Iodine Value | Percent Loss | Percent Linoleic Acid | Percent Loss |
|---|---|---|---|---|
| Safflower fatty acids: |  |  |  |  |
| Control | 149.0 |  | 77.8 |  |
| 16 days | 133.3 | 10.5 | 59.3 | 23.8 |
| 49 days | 102.1 | 31.5 | 34.4 | 55.8 |
| Arginine safflate: |  |  |  |  |
| Control | 92.1 |  | 55.0 |  |
| 16 days | 94.1 | 0 | 50.5 | 23.8 |
| 49 days | 93.1 | 0 | 51.3 | 6.7 |
| Lysine safflate: |  |  |  |  |
| Control | 90.6 |  | 44.8 |  |
| 16 days | 87.2 | 3.8 | 45.4 | 0 |
| 49 days | 87.3 | 3.7 | 43.7 | 2.4 |
| Lysine linoleate: |  |  |  |  |
| Control | 116.8 |  | 64.5 |  |
| 16 days | 113.9 | 2.5 | 62.4 | 3.2 |
| 49 days | 114.2 | 2.2 | 62.0 | 3.9 |

B. 60° C. OVEN STORAGE TEST OF THE SOLID SALTS

|  | Iodine Value | Percent Loss | Percent Linoleic Acid | Percent Loss |
|---|---|---|---|---|
| Linoleic acid: |  |  |  |  |
| Control | 181.0 |  | 100 |  |
| 10 days | 97.1 | 46.4 | 21.4 | 78.6 |
| 25 days | 67.4 | 79.4 | 9.4 | 90.6 |
| 54 days | 60.0 | 81.7 | 6.3 | 93.7 |
| Safflower fatty acids: |  |  |  |  |
| Control | 149.0 |  | 77.8 |  |
| 10 days | 115.4 | 22.6 | 46.1 | 40.7 |
| 25 days | 113.8 | 23.6 | 43.7 | 43.8 |
| 54 days | 89.1 | 40.2 | 19.9 | 74.4 |
| Arginine safflate: |  |  |  |  |
| Control | 92.1 |  | 55.0 |  |
| 10 days | 92.8 | 0 | 48.4 | 12.0 |
| 25 days | 90.6 | 1.6 | 44.1 | 19.8 |
| 54 days | 86.4 | 6.2 | 41.9 | 23.8 |
| Lysine safflate: |  |  |  |  |
| Control | 90.6 |  | 44.8 |  |
| 10 days | 92.9 | 0 | 47.5 | 0 |
| 25 days | 93.1 | 0 | 45.6 | 0 |
| 53 days | 93.6 | 0 | 47.4 | 0 |
| 103 days | 92.1 | 0 | 45.7 | 0 |
| Lysine linoleate: |  |  |  |  |
| Control | 116.8 |  | 64.5 |  |
| 10 days | 114.8 | 1.7 | 62.2 | 3.6 |
| 25 days | 114.5 | 2.0 | 60.4 | 6.4 |
| 53 days | 114.8 | 1.7 | 62.8 | 2.6 |
| 103 days | 113.3 | 3.0 | 59.5 | 7.8 |

The iodine value is determined by the American Oil Chemists' Society Tentative Method L 8a–57 and the percent linoleic acid is determined by the ultraviolet spectrophotometric method (American Oil Chemists' Society Tentative Method L 12a–55).

Having thus fully described the character of the instant invention, what is desired to be claimed and protected by Letters Patent is:

1. A salt of linoleic acid and an edible basic amino acid.
2. L-arginine linoleate.
3. L-lysine linoleate.
4. L-ornithine linoleate.
5. L-2,4-diaminobutyric acid linoleate.

No references cited.